United States Patent Office 2,704,710
Patented Mar. 22, 1955

2,704,710

PRECIPITATION OF AZO DYES IN SILVER HALIDE EMULSIONS BY MEANS OF GUANIDINE AND BIGUANIDE COMPOUNDS CONTAINING LONG ALKYL CHAINS

Joseph A. Sprung, Easton, Pa., assignor to General Aniline & Film Corporation, New York, N. Y., a corporation of Delaware No Drawing. Application April 18, 1950, Serial No. 156,729

5 Claims. (Cl. 95—2)

The present invention pertains to photographic emulsions for use in the silver-azo dye bleachout process and containing azo dyes rendered fast to diffusion in the emulsions by means of guanidine and biguanide compounds containing long aliphatic chains.

Multilayer color film for use in the silver-azo dye bleachout process are prepared by incorporating yellow, magenta and cyan azo dyes in the blue, green and red sensitive layers, respectively, of such film. It is essential that these dyes do not migrate from their respective layers during the preparation and processing of such film as otherwise degraded azo dye color images will be obtained.

It has been proposed to place the azo dyes in the emulsions of such film in a non-diffusing state by precipitating acid azo dyes with basic dyes or strong organic bases. The basic materials used for this purpose form stable complex silver salts and frequently displace the optical sensitizing dyes from the silver halide crystal lattices. When this ensues, the speed of the photographic emulsion involved is necessarily impaired. However, such film could generally be used for making color prints.

Heymer U. S. P. 1,954,294 was the first to suggest the precipitation of acid azo dyes in photographic silver halide emulsions and he suggested for this purpose naphthyl biguanide or basic dyestuffs. Subsequently diphenyl guanidine was suggested as a precipitating agent, and in this connection reference is made to U. S. P. 2,172,308. Although compounds of the above type precipitate azo dyes from aqueous solutions, it was soon ascertained that they do not satisfactorily prevent layerwise diffusion of such dyes when they are incorporated in photographic multilayer material.

The deficiencies in the aforementioned compound having been observed, it was suggested that precipitation of the azo dyes in the emulsions be brought about by using a high molecular basic material, and for this purpose U. S. P. 2,317,184 describes the condensation product of an amine, formaldehyde and dicyandiamide.

More recently U. S. P. 2,368,647 proposed polybiguanides as the precipitating agents. It was claimed that these polyfunctional materials were superior to the simple phenyl and naphthyl biguanides, and this claim has been confirmed by actual experimentation.

I have now discovered, however, that the diffusion of azo dyes from silver halide emulsions can be completely prevented by the utilization of mono-functional guanidines and biguanides in contrast to the poly-functional compounds mentioned above, providing that the aforesaid mono-functional products contain an aliphatic chain of at least 8 carbon atoms.

The precipitation of azo dyes in photographic emulsions by the utilization of such guanidines and biguanides and silver halide emulsions containing azo dyes so precipitated constitute the purposes and objects of the present invention.

The compounds which we have found to be effective in rendering azo dyes non-migratory in photographic silver halide emulsions are those of the following formulae:

$$\begin{array}{c}R_1\phantom{xxxx}R_3\\ \diagdown\phantom{xx}\diagup\\ N-C-N\\ \diagup\phantom{x}\|\phantom{x}\diagdown\\ R_2\phantom{xx}NH\phantom{xx}R_4\end{array}$$

and

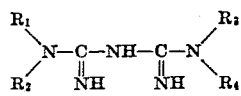

wherein $R_1$ is an alkyl radical of at least 8 carbon atoms, such as octyl, nonyl, decyl, dodecyl, tetradecyl, hexadecyl, heptadecyl, octadecyl and the like, or an aromatic radical containing an aliphatic chain of at least 8 carbon atoms, such as octylphenyl, dodecyl phenyl, tetradecyl phenyl, decoxphenyl, dodecoxyphenyl, tetradecoxyphenyl, and the like, caprylamidophenyl, laurylamidophenyl, stearylamidophenyl and the like, decylsulfonamidophenyl, dodecylsulfonamidophenyl and the like, octylcarbamylphenyl, decylcarbamylphenyl, dodecylcarbamylphenyl, and the like, caprophenone, stearophenone and the like, $R_2$ and $R_3$ are hydrogen, alkyl such as methyl, ethyl, propyl, butyl, amyl and the like, or aryl such as phenyl, naphthyl, toluyl, anisyl and the like, and $R_4$ is hydrogen or alkyl as above.

Examples of such compounds are:

(1) $\mathrm{C_{12}H_{25}NHC-NH_2}$
$\phantom{C_{12}H_{25}NHC}\|$
$\phantom{C_{12}H_{25}NH}\mathrm{NH}$ Dodecyl guanidine (2) $\mathrm{C_{12}H_{25}NHC-N}\!\!-\!\!\diagup\!\!\diagdown$
$\phantom{xxxxxxxxx}\|\phantom{xx}\mathrm{H}$
$\phantom{xxxxxxxx}\mathrm{NH}$ 1-dodecyl-3-phenylguanidine (3) $\mathrm{C_{10}H_{21}NHC-NH-C_5H_{11}}$
$\phantom{xxxxxxxxx}\|$
$\phantom{xxxxxxxxx}\mathrm{NH}$ 1-decyl-3-amylguanidine (4) $\mathrm{C_{18}H_{37}NHCN}\diagdown^{\mathrm{CH_3}}$
$\phantom{xxxxxxxx}\|\phantom{xxx}$
$\phantom{xxxxxxx}\mathrm{NH}\phantom{xx}\mathrm{CH_3}$ 1-octadecyl-3-dimethylguanidine (5) $\mathrm{C_{12}H_{25}N-\!\!-\!\!C-\!\!NH_2}$
$\phantom{xxxxx}|\phantom{xx}\|$
$\phantom{xxxx}\mathrm{CH_3}\phantom{x}\mathrm{NH}$ 1-dodecyl-1-methylguanidine (6) 1-(2'-tetradecoxyphenyl)-guanidine (7) 1-octadecyl-1-phenyl-3-isopropylguanidine (8) 1-(4'-laurylamidophenyl)-3-phenylguanidine (9) 1-(3'-methyl-4'-tetradecylsulfonamidophenyl)-guanidine

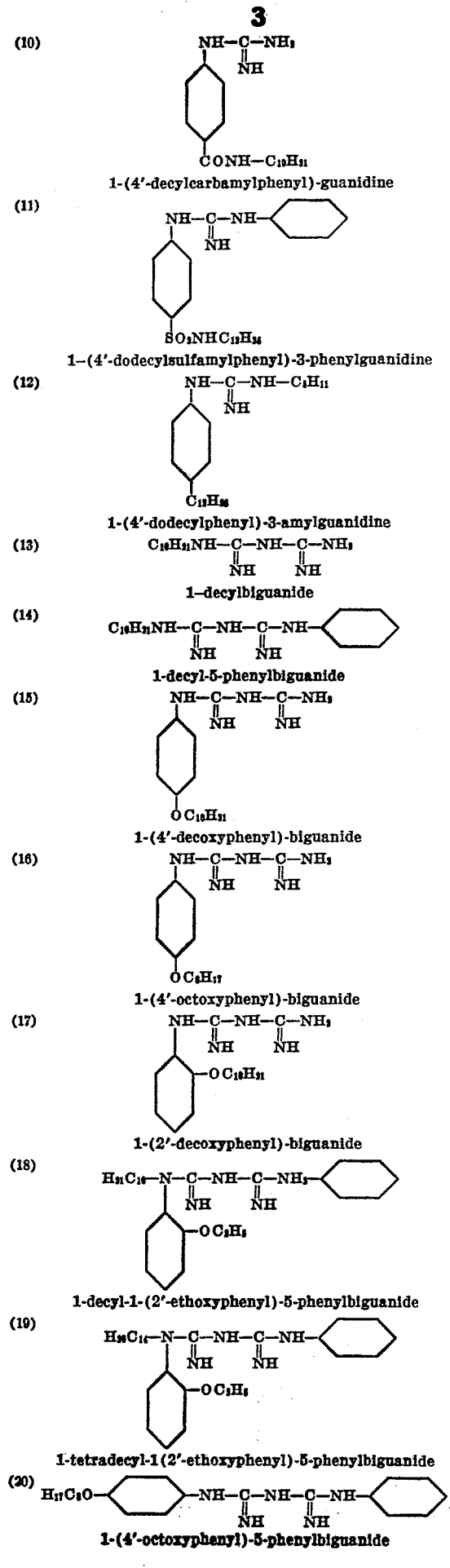
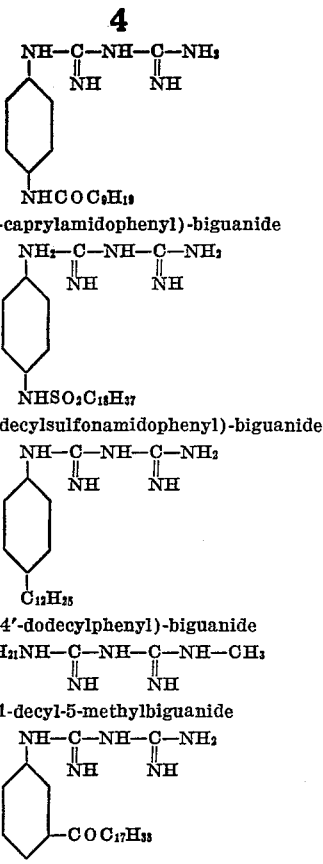

1-(3'-stearoylphenyl)-biguanide
(26)   1-(dodecyl)-1-methylbiguanide

The above compounds are for the most part known compounds or can be prepared by conventional methods. Thus the guanides may be prepared as follows:

1. The reaction of cyanamide or isothiourea-alkyl ethers with an amine containing an aliphatic chain of at least 8 carbon atoms as per U. S. P. 2,213,474.
2. The reaction of a substituted cyanamide of the formula

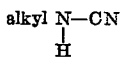

(prepared according to U. S. P. 2,331,670) with an amine containing an aliphatic chain of at least 8 carbon atoms.
3. The reaction of thiourea derivatives described in the Journal of the Chemical Industry, page 1063, 1946, with an amine containing an aliphatic chain of at least 8 carbon atoms.
4. The reaction of an arylcyanamide (Beilstein, vol. 12, p. 368, Fourth edition), with an amine containing an aliphatic chain of at least 8 carbon atoms.

The biguanides, on the other hand, may be prepared as follows:
1. The reaction of dicyandiamide with an amine containing an aliphatic chain of at least 8 carbon atoms as per U. S. P. 2,213,474 (see also U. S. P. 2,149,709).
2. The reaction of compounds of the formula

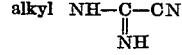

(described in Journal of Organic Chemistry, vol. 12, p. 437, 1947) with an amine containing an aliphatic chain of at least 8 carbon atoms.
3. The reaction of compounds of the formula

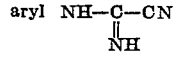

(described in the Journal of the Chemical Society, p. 729, 1946) with amines containing an aliphatic chain of at least 8 carbon atoms.
4. The reaction of compounds of the formula

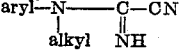

(described in the Journal of the Chemical Society, p.

729, 1946) with amines containing an aliphatic chain of at least 8 carbon atoms.

The amines utilized in the above reactions may be primary or secondary amines and aliphatic or aromatic in character.

Suitable aliphatic amines are octylamine, nonyl amine, decylamine, dodecylamine, tetradecylamine, methyldodecylamine, octylethylamine and the like.

Suitable aromatic amines are:

2-tetradecoxyaniline
2-octadecoxyaniline
2-dodecoxyaniline
2-decoxyaniline
4-dodecoxyaniline
4-tetradecoxyaniline
4-dodecylaniline
2-chloro-4-dodecylaniline
4-decylaniline
4-tetradecylaniline
4-aminocapranilide
4-aminolauranilide
4-amino-2-methyl-tetradecane sulfonanilide
4-amino-N'-decylbenzamide
N'-dodecylsulfanilamide
3-aminostearophenone
N-phenyloctadecylamine
N-(2,5-dichlorophenyl)-octadecylamine
N-(2,5-dimethoxyphenyl)-octadecylamine
N-(2-naphthyl)-octadecylamine
N-(2-ethoxyphenyl)-decylamine,
and the like.

It is apparent from the above that in the aromatic amines, the long aliphatic chain may be directly linked to the aromatic ring or may be linked thereto by a homopolar linkage such as —NH—, —CONH—, —NHCO—, —SO₂NH—, —NHSO₂—, —CO—, —O—. This of course means that character R₁ in the above guanidines and biguanides where it comprises an aromatic radical may have a long aliphatic chain linked to an aromatic ring in the same fashion.

Certain of the primary aromatic amines of the type contemplated above, and their method of preparation, are described in my copending application Serial No. 43,756, filed August 11, 1948. Others referred to above, and particularly those in which the long aliphatic chain is directly linked to the aromatic ring are described in U. S. P. 2,118,493. Aromatic primary amines in which the aliphatic chain is linked to the aromatic ring by a keto group may be prepared from the ketones described in the Journal of Organic Chemistry, vol. 2, p. 499, 1938, by nitrating the same and reducing the nitro group to an amino group by conventional procedure.

The secondary aromatic amines containing a long aliphatic chain linked to the nitrogen atom thereof may be prepared by the reaction of aniline or a derivative thereof with the desired long chained alkyl bromide. A specific method of preparing, for example, N-phenyloctadecylamine, is as follows: A mixture of 16.7 g. (0.05 mole) of octadecylbromide and 19 g. (0.205 mole) of aniline was heated on the steam bath for 3 hours. The product was first extracted with warm dilute hydrochloric acid to remove the excess aniline, and the residue was then melted under dilute sodium carbonate solution. The oily base slowly acidified when the flask was cooled in an ice bath. After several recrystallizations from ethanol, the product melted at 50–53° C. Yield: 14.0 g. (81%). The hydrochloride (M. P. 101° C.) was prepared from the free base by dissolving the latter in ethanol and pouring the alcoholic solution in dilute hydrochloric acid.

Other desired secondary amines are prepared in the same way by using the desired aromatic amine and the selected alkyl bromide in lieu of the corresponding components in the above procedure.

Photographic emulsions which are to be treated according to the present invention are prepared by adding a few cc. of a 2% aqueous solution of an acid azo dyestuff to about 25 g. of a sensitized silver halide gelatin emulsion. To the stirred emulsion is then added a few cc., i. e., from 1 to 3, of a stock guanidine or biguanide solution. The emulsion is then coated on a film base, dried, exposed and processed according to the usual bleachout procedure.

The stock guanidine or biguanide solution is prepared by dissolving about .01 mole of the selected compound in a small amount of water, for example, about 50 cc. containing a small quantity of a suitable acid, such as about .02 moles of formic, acetic or phosphoric acid. The particular acid selected will depend upon the solubility of the guanidine or biguanide derivative which is used for effecting the precipitation.

It is, of course, understood that my invention finds its greatest application in the preparation of tripacks to be processed by the silver azo dye bleach method. This of course means that the emulsion layer of the tripack sensitized for blue will contain a yellow azo dye, the emulsion layer sensitized for green will contain a magenta azo dye, and the emulsion layer sensitized for red will contain a cyan azo dye.

Examples of satisfactory yellow azo dyes are those of the following formulae:

(a) 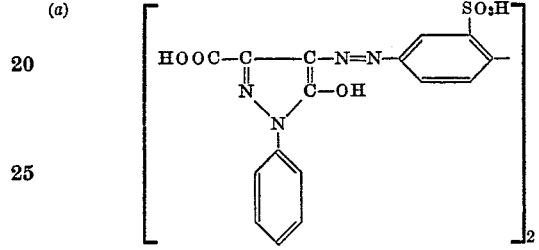

(b) 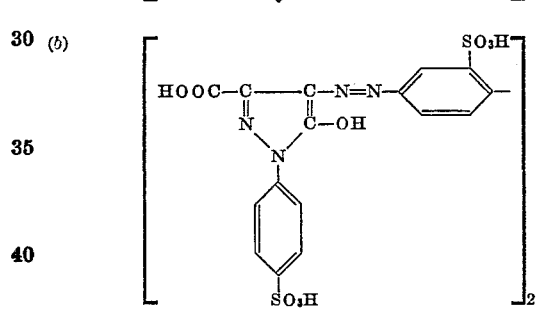

(c) 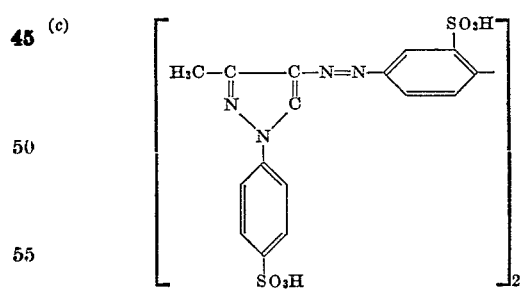

Satisfactory magenta azo dyes are those of the following formulae:

(a) 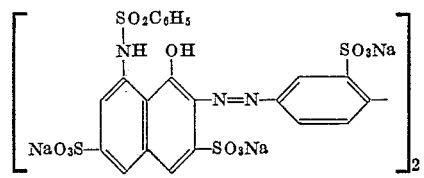

(b) 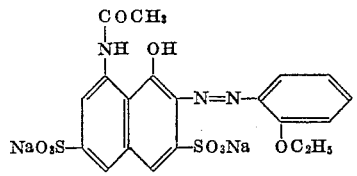

(c) 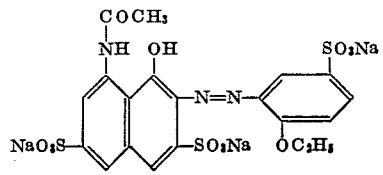

Satisfactory cyan azo dyes are such commercial dyes as:

(a) Chlorantine Fast Green BLL.
(b) Pontamine Fast Green 5BL.
(c) Diazo Fast Green GFL.
(d) Brilliant Benzo Green B.
(e) Diazo Brilliant Green 3GA.

A tripack prepared with emulsion layers containing azo dyes of the above type and treated with one of my biguanides or guanidine derivatives in the manner noted will yield by processing with the silver azo dye bleach method, clearly defined azo dye images showing no sign of layerwise diffusion of the azo dyes. For processing of such material, one may employ the procedure described in my copending application Serial No. 716,422, filed December 14, 1946, now Patent No. 2,564,238.

The invention is illustrated by the following examples but it is to be understood that the invention is not restricted thereto.

EXAMPLE 1

*1-dodecyl guanidine*

A mixture of 9.2 g. (0.05 mole) dodecylamine and 7 g. (0.05 mole) S-methyl isothiourea sulfate in 10 cc. of absolute ethanol was heated under reflux for 7 hours. Provisions were made to absorb the liberated methyl mercaptan in sodium hydroxide solution. The solution was cooled, and the dodecylguanidine sulfate was removed by filtration. The product was recrystallized from ethanol and air dried. Yield: 10.2 g. (75.0%).

The dodecylguanidine sulfate was dissolved in boiling water, and treated with 10% sodium hydroxide solution to obtain the free base.

EXAMPLE 2

*1-(2'-tetradecoxyphenyl) guanidine*

A solution of 6.8 g. (0.02 mole) 2-tetradecoxyaniline hydrochloride and 1.26 g. (0.03 mole) of cyanamide in 25 cc. of ethanol was heated under reflux for 12 hours. The solution was poured into 100 cc. of water and made alkaline with 10% sodium hydroxide. The semi-solid material was removed by filtration, dissolved in dilute acetic acid and reprecipitated with 10% sodium hydroxide. The air dried material weighed 6.4 g. (93%).

EXAMPLE 3

*1-decylbiguanide*

A mixture of 3.9 g. (0.02 mole) of decylamine hydrochloride and 2.5 g. (0.03 mole) of dicyandiamide was heated to 190° C. until a complete melt was obtained, then cooled to 175° C. and maintained at that temperature for 1 hour. The melt was dissolved in 50 cc. of water and the solution was made alkaline with 10% sodium hydroxide solution. The semi-solid material was extracted with ether, 25 cc. of benzene was added to the ether extract and the whole was evaporated to dryness under vacuum. The waxlike residue weighed 4 g. (83%).

1-decyl-5-phenyl biguanide was prepared in the same manner from decylamine hydrochloride and phenylcyanoguanidine.

EXAMPLE 4

*1-(4'-decoxyphenyl) biguanide*

A solution of 200 g. (0.7 mole) of 4-decoxyaniline hydrochloride, 88 g. (1.05 mole) of dicyandiamide in 900 cc. of ethanol was heated under reflux for 12 hours. The reaction mixture was poured into 2000 cc. of water containing 5 cc. of acetic acid, heated to boiling, treated with boneblack, filtered, and then made strongly alkaline with 10% sodium hydroxide solution. The biguanide, which separated, was removed by filtration, washed with 2000 cc. of water, and air dried. Yield: 174 g. (75%).

1-(4'-octoxyphenyl) biguanide, 1-(4'-dodecoxyphenyl) biguanide, 1-(4'-tetradecoxyphenyl) biguanide were prepared in the same manner while using respectively 4-octoxyaniline hydrochloride, 4-dodecoxyaniline hydrochloride and 4-tetradecoxyaniline hydrochloride in lieu of 4-decoxyaniline hydrochloride.

EXAMPLE 5

*1-(2'-decoxyphenyl) biguanide*

The procedure is the same as in Example 4 excepting that the 4-decoxyaniline hydrochloride is replaced by 2-decoxyaniline hydrochloride and the final product is isolated by extraction with ether.

EXAMPLE 6

*1-(2'-tetradecoxyphenyl) biguanide*

The procedure is the same as in Example 3, excepting that there is used 2-tetradecoxyaniline hydrochloride, and the biguanide is isolated by extraction with ether.

EXAMPLE 7

The procedure is the same as in Example 4, except that there is used 4-aminolauranilide, whose preparation is described in my copending application Serial No. 43,756 filed August 11, 1948.

4-aminocaprylanilide may be used instead of 4-aminolauranilide in preparing the corresponding biguanide.

EXAMPLE 8

The procedure is the same as in Example 4, except that there is used p-dodecylaniline, whose preparation is decribed in U. S. 2,118,493.

EXAMPLE 9

A multilayer silver azo dye bleachout material was prepared as follows:

On an opaque film base there was cast a layer prepared from 25 g. of a silver halide emulsion (red sensitive), 5 cc. of a 2% solution of Chlorantine Fast Green BLL, and 2 cc. of a stock solution of 1-(4'-dodecoxyphenyl) biguanide.

Over this layer there was cast a layer prepared from 25 g. of 2% gelatin, and .25 cc. of the aforementioned biguanide stock solution.

Over this layer there was cast a layer prepared from 25 g. of a silver halide emulsion (green sensitive), 5 cc. of a 2% stock solution of magenta azo dye (a), and 1.5 cc. of the aforementioned biguanide stock solution.

Over this layer there was cast a layer the same as that on the red sensitive layer.

Over the latter layer there is cast a yellow colloidal silver filter layer.

Over this layer there is cast a gelatin layer the same as that on the red sensitive layer.

Over the last named layer there is cast a layer prepared from 25 g. of silver halide emulsion (blue sensitive), 5 cc. of a 2% solution of yellow azo dye (a), and 2.5 cc. of the aforementioned biguanide stock solution.

The sensitized emulsion layers and the colloidal silver filter layer in the above material are cast to a thickness of 5 microns whereas the three gelatin layers are cast to a thickness of 2 microns.

A microscopic cross-section of this film showed that none of the dyes had diffused from their respective layers.

The above material was exposed and processed by the bleachout method described in my copending application Serial No. 716,422, filed December 14, 1946.

The azo dye images were well defined and of high intensity, showing no degradation of the color images.

It is understood that any of the guanidines or biguanides previously referred to may be utilized in lieu of that of Example 9 while obtaining the same results.

I claim:

1. A photographic silver halide emulsion containing an azo dyestuff rendered fast to diffusion in the emulsion by the addition of a small quantity of a compound of the following formula:

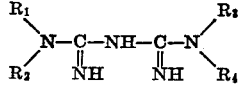

wherein $R_1$ is an aromatic radical having linked thereto an alkyl chain of at least 8 carbon atoms, $R_2$ and $R_3$ are selected from the class consisting of hydrogen, alkyl and aryl, and $R_4$ is selected from the class consisting of hydrogen and alkyl.

2. A photographic multilayer material for processing by the silver azo dye bleachout method comprising a red sensitive silver halide emulsion layer containing a cyan azo dye, a green sensitive silver halide emulsion layer containing a magenta azo dye, and a blue sensitive silver halide emulsion layer containing a yellow azo dye, the dyes in each layer being rendered fast to diffusion by treatment with a guanidine compound of the following formula:

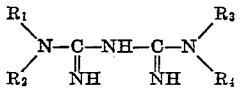

wherein $R_1$ is an aromatic radical having linked thereto an alkyl chain of at least 8 carbon atoms, $R_2$ and $R_3$ are selected from the class consisting of hydrogen, alkyl and aryl, and $R_4$ is selected from the class consisting of hydrogen and alkyl.

3. A photographic silver halide emulsion containing an azo dyestuff precipitated therein to render it fast to diffusion in the emulsion by means of 1-(4'-dodecoxyphenyl) biguanide.

4. The process of rendering an azo dyestuff non-migratory in a photographic silver halide emulsion which comprises precipitating the same in the emulsion by means of an acid solution of a guanidine compound of the following formula:

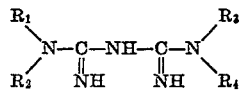

wherein $R_1$ is an aromatic radical having linked thereto an alkyl chain of at least 8 carbon atoms, $R_2$ and $R_3$ are selected from the class consisting of hydrogen, alkyl and aryl, and $R_4$ is selected from the class consisting of hydrogen and alkyl.

5. The process as defined in claim 4 wherein the guanidine compound is 1-(4'-dodecoxyphenyl) biguanide.

References Cited in the file of this patent

UNITED STATES PATENTS

| | | |
|---|---|---|
| 1,954,294 | Heymer | Apr. 10, 1934 |
| 2,172,308 | Gaspar | Sept. 5, 1939 |
| 2,186,849 | Wilmanns et al. | Jan. 9, 1940 |
| 2,268,630 | Wilmanns et al. | Jan. 6, 1942 |
| 2,294,892 | Carroll | Sept. 8, 1942 |
| 2,317,184 | Dreyfuss | Apr. 20, 1943 |
| 2,364,374 | Knott | Dec. 5, 1944 |
| 2,368,647 | Dreyfuss | Feb. 6, 1945 |
| 2,545,423 | Duerr | Mar. 13, 1951 |